United States Patent [19]
Schulte

[11] Patent Number: 5,729,871
[45] Date of Patent: Mar. 24, 1998

[54] DEVICE FOR SECURING WRAPAROUND PACKAGING STRIPS

[76] Inventor: Herbert Schulte, Im Kreuzseifen 4, D-57489 Drolshagen, Germany

[21] Appl. No.: 592,372

[22] PCT Filed: Sep. 3, 1994

[86] PCT No.: PCT/DE94/01020

§ 371 Date: Jan. 29, 1996

§ 102(e) Date: Jan. 29, 1996

[87] PCT Pub. No.: WO95/09116

PCT Pub. Date: Apr. 6, 1995

[30]  Foreign Application Priority Data

Sep. 30, 1993 [DE] Germany .............. 43 33 317.6

[51] Int. Cl.[6] ............................................. B65D 63/00
[52] U.S. Cl. ............................................. 24/16 R
[58] Field of Search ................... 24/16 R, 16 PB, 24/17 A, 17 AP, 30.5 R, 30.5 P; 248/74.3

[56]  References Cited

U.S. PATENT DOCUMENTS

| | | | |
|---|---|---|---|
| 4,958,414 | 9/1990 | Benoit | 24/16 PB |
| 5,230,541 | 7/1993 | Nowak | 24/16 PB |
| 5,377,510 | 1/1995 | Smith | 24/16 PB |

*Primary Examiner*—James R. Brittain
*Attorney, Agent, or Firm*—Herbert Dubno; Yuri Kateshov

[57]  ABSTRACT

A device for securing wraparound packaging material includes a locking strap element formed with an elastic arm extending into an insertion channel of the locking element and a tightening element which is formed with a pivotal handle swingable between an open position of the arm of the strap element and a closed position of the arm defining securing of the wraparound material.

3 Claims, 3 Drawing Sheets

500,000

DEVICE FOR SECURING WRAPAROUND PACKAGING STRIPS

CROSS REFERENCE TO RELATED APPLICATIONS

This application is a national phase application based on PCT/DE94/01020 filed Sep. 3, 1994 and based, in turn, on German application P 43 33 317.6 filed on 30 Sep. 1993 Under the International Convention.

FIELD OF THE INVENTION

The invention relates to a device for securing wraparound packaging material, such as strips, foils and similar web-shaped or strip-shaped flexible elements, for packs or stacks of individual goods, such as stones or similar cube-shaped products.

Such a device is known from U.S. Pat. No. 4,958,414.

Further from the DE 91 08 921 U1. There the locking mechanisms have not proven to be very useful in practice, since the handling of the securing devices is cumbersome, and their construction and arrangement are complicated and not very durable.

OBJECTS OF THE INVENTION

It is the object of the present invention to create a device having a simple construction; and Another object of the invention is to provide the device with a high degree of safety against unintentional opening.

SUMMARY OF THE INVENTION

The inventive device has the web-shaped or strip-shaped element has a joint area running across the wrapping direction, which can be bridged by the securing device, whereby the securing device consists of locking strips which are detachably connected to each other and which have interlocking draw-in and clamping means plus a handle, one element of which is attached to the free end of one locking strip, while its other element is attached to the free end of another locking strip working in conjunction with the first, or is formed by the second locking strip.

A locking part with a housing traversed by the insertion channel provided with the bendable arm which is affixed to one housing wall. The bendable arm be provided with at least one transversely projecting pin and a handle which is rotatable about an axis parallel to the pin is equipped with a guide cam resting against the pin, which in the open position keeps the pin and thereby the arm in an out-of-engagement position away from the insertion channel, releases the pin in the engagement position, so that the arm with its lock catch engages in the locking teeth of the first element, and in the closed position locks the pin in the engaged position.

Thereby it is advantageously provided for the handle to extend parallelly to the insertion channel and its free end be pointed towards the end of the insertion channel, which faces away from the point where the insertion starts.

The housing together with the bendable arm is easily made of plastic material, whereby the handle can also be made of plastic material and can have pivots on both sides, which are insertable in corresponding recesses of the housing and form the rotation axis of the handle. The construction of the first and second element is extremely simple, whereby the second element is a component of simple construction, which consists merely of two parts, namely of a housing part with an insertion channel and an arm formed thereon and the handle supported swingably or rotatably on the housing part. The housing part can be secured in a suitable manner to the other locking strip or to the wraparound packaging material itself, which consists of a web-like or strip-like material. The handling is extremely simple. In order to tie down such wraparound packaging material, the strip-shaped part with the locking teeth is slipped into the insertion channel of the securing part, whereby the handle and therewith also the arm are in the insertion position, wherein the arm extends into the insertion channel due to its inherent preliminary stress. During the passage of the locking teeth the arm is respectively lifted and lowered, corresponding to the teeth succession, which is made possible by the elasticity of the arm.

After reaching the target position, the arm can be locked in place by rotating the handle, so that its elastic swinging motion is stopped. If the corresponding wraparound packing is to be opened, the handle is swung into the opening position, whereby the arm is swung out of engagement in opposition to its own elasticity. In this position the strip-like part provided with the locking teeth can be extracted and consequently the package can be opened.

The housing together with the bendable arm is easily made of plastic material, whereby the handle can also be made of plastic material and can have pins on both sides, which are insertable in corresponding recesses of the housing and form the rotation axis of the handle.

The construction of such a first element with barb-like locking teeth is known per se to the state of the art. The second element is an extremely simple component, which consists merely of two parts, namely of a housing part with an insertion channel and an arm formed thereon and the handle supported swingably or rotatably on the housing part. The housing part can be secured in a suitable manner to the other locking strip or to the wraparound packaging material itself, which consist of a web-like or strip-like material. The handling is extremely simple. In order to tie down such wraparound packaging material, the strip-shaped part with the locking teeth is slipped into the insertion channel of the securing part, whereby the handle and therewith also the arm are in the insertion position, wherein the arm extends into the insertion channel due to its inherent preliminary stress. During the passage of the locking teeth the arm is respectively lifted and lowered, corresponding to the teeth succession, which is made possible by the elasticity of the arm.

After reaching the target position, the arm can be locked in place by rotating the handle, so that its elastic swinging motion is stopped. If the corresponding wraparound packing is to be opened, the handle is swung into the opening position, whereby the arm is swung out of engagement in opposition to its own elasticity. In this position the strip-like part provided with the locking teeth can be extracted and consequently the package can be opened.

A further development consists in that the securing part has a housing, which is traversed by the insertion channel, whereby on one of the housing walls the arm is formed, that the bendable arm has at least one transversely projecting pin and that the handle which is rotatable about an axis parallel to the pin has a guide cam supported on the pin, which in the open position keeps the pin and thereby the arm in an unengaged position, away from the insertion channel, and in engagement position releases the pin so that the arm with its lock catch engages in the locking teeth of the first element and in the locked position secures the pin in the engaged position.

The housing together with the bendable arm is easily made of plastic material, whereby the handle can also be made of plastic material and can have pins on both sides, which are insertable in corresponding recesses of the housing and form the rotation axis of the handle.

Advantageously it is also provided that the guide cam has an eccentric surface acting upon the pin in the open position of the handle, and adjacent thereto a surface shaped like an arc of circle against which the pin rests in the engagement and in the locking position, and in the locked position has a locking recess at the end of the guide cam, wherein the pin engages in the locked position.

This way a perfect guidance of the arm during the actuation of the handle is achieved, whereby in addition this construction makes possible to insert the handle with the formed-on pins into grooves arranged in the wall parts of the housing, whereby the groove is open towards the arm and is closed on the side facing away from the arm. Due to the arm and therefore to the pins located thereon which are in engagement with the guide cam, the arm is kept in the target position without requiring special fastening means.

Further it is provided for the handle to have an actuation lever formed thereon, which in the closed position comes to lie flush with a housing surface parallel to the insertion channel, in the engagement position projects therefrom at a right angle and in the out-of-engagement position forms an obtuse angle with the position corresponding to the closed position.

BRIEF DESCRIPTION OF THE DRAWINGS

The above and other objects, features, and advantages will become more readily apparent from the following description, reference being made to the accompanying drawing in which.

SPECIFIC DESCRIPTION

Figure 1:
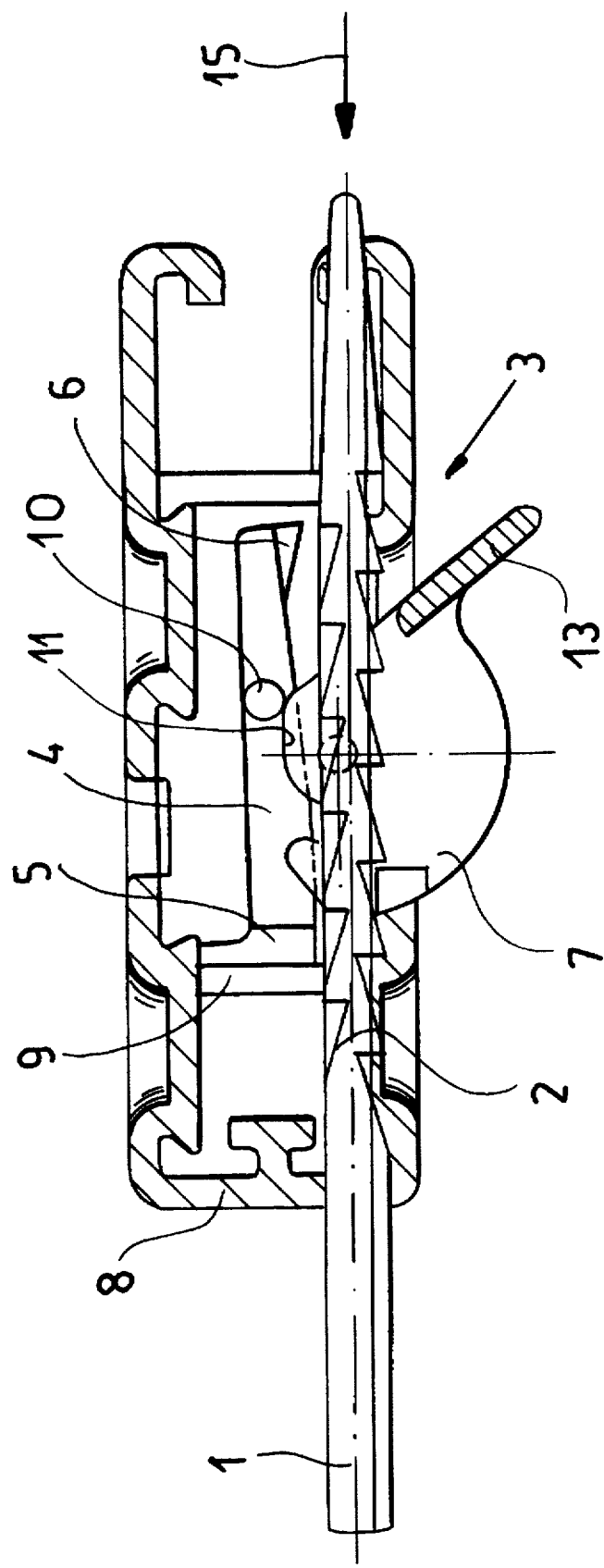
FIG. 1 is a side view of a device according to the invention.

According to the invention the first element 1 is formed by a strip-like part (tightening strap) with locking teeth 2. The second element 3 is formed by a securing part, which has an insertion channel for the first element 1 and an elastic arm 4 extending into the insertion channel as a lock catch, whose one end (at 5) is supported on the securing part, and particularly is made in one piece with the latter and whose free end bears the lock catch 6. The arm extends almost parallelly to the insertion channel and its free end (which is provided with the lock catch 6) points towards the end of the insertion channel which faces away from the point where the insertion starts, namely to the right in the drawing figures.

Figure 3:
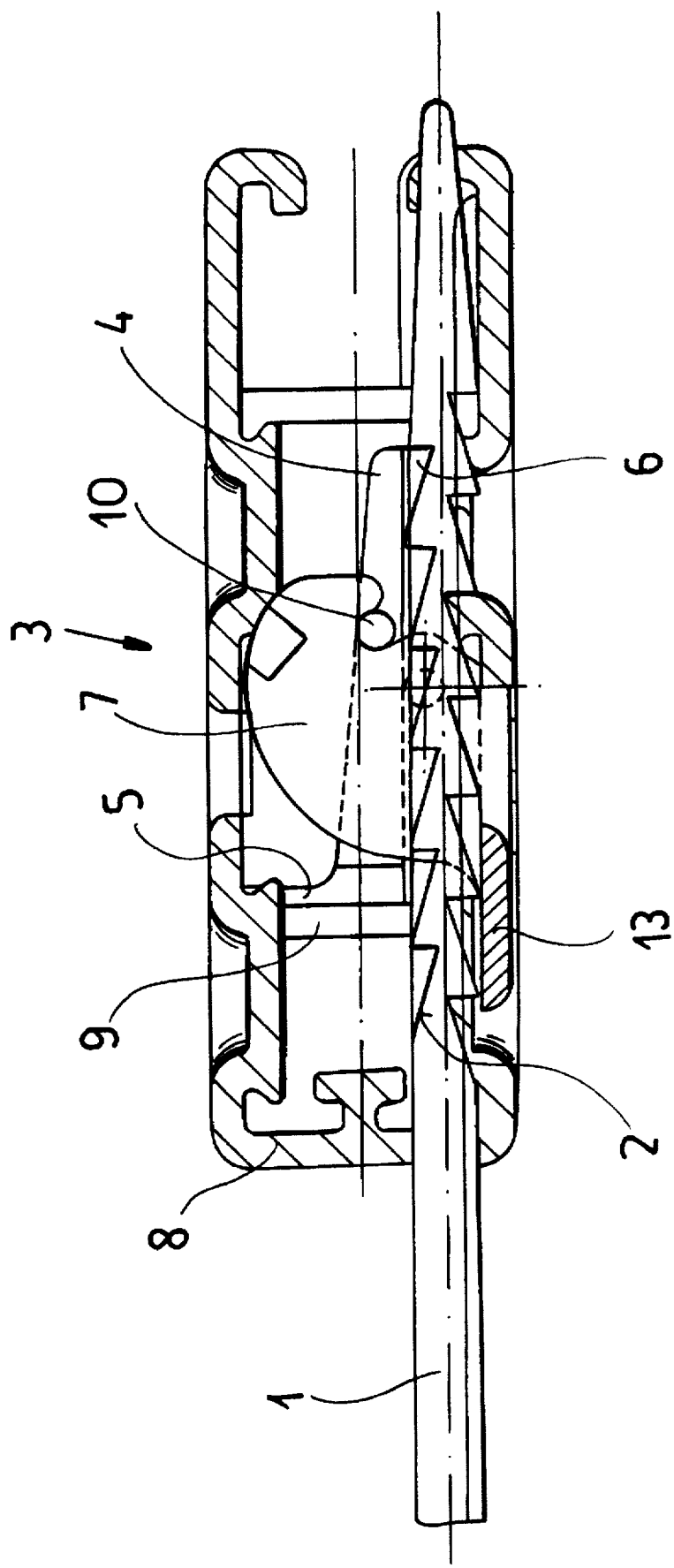
FIG. 3 is a side view of the device in the locked position.

On the securing part a pivotable handle 7 is supported, by means of which the arm 4 can be bent into an out-of-engagement position (FIG. 1) with respect to element 1 and by means of which the arm 4 can be locked in an inflexibly engaged position with respect to the first element, as shown in FIG. 3.

The securing part has a housing 8, which is traversed by the insertion channel. Thereby the bendable arm 4 is formed on a housing wall 9. The bendable arm 4 has at least one transversely projecting pin 10, while the handle 7, rotatable about an axis parallel to the pin 10, has a guide cam 11 resting against the pin 10, which in the open position (FIG. 1) pushes the pin 10 and therewith the arm 4 into an out-of-engagement position, away from the insertion channel, and in its engagement position, according to FIG. 2, releases or almost releases the pin 10, so that the arm 4 with its lock catch 6 engages in the locking teeth 2 of the element 1 (compare FIG. 2) and in a closed position (compare FIG. 3) locks the pin in the engaged position. The guide cam 11 has in the open position of the handle 7 according to FIG. 1 an eccentric surface acting upon the pin 10, and an adjacent surface shaped like an arc of circle, whereon the pin 10 rests in the engagement position (FIG. 2) and in the closed position (FIG. 3), whereby in the closed position a locking recess 12 is provided at the end of the guide cam 11, which in the closed position reaches over the pin 10 locking it.

Figure 2:
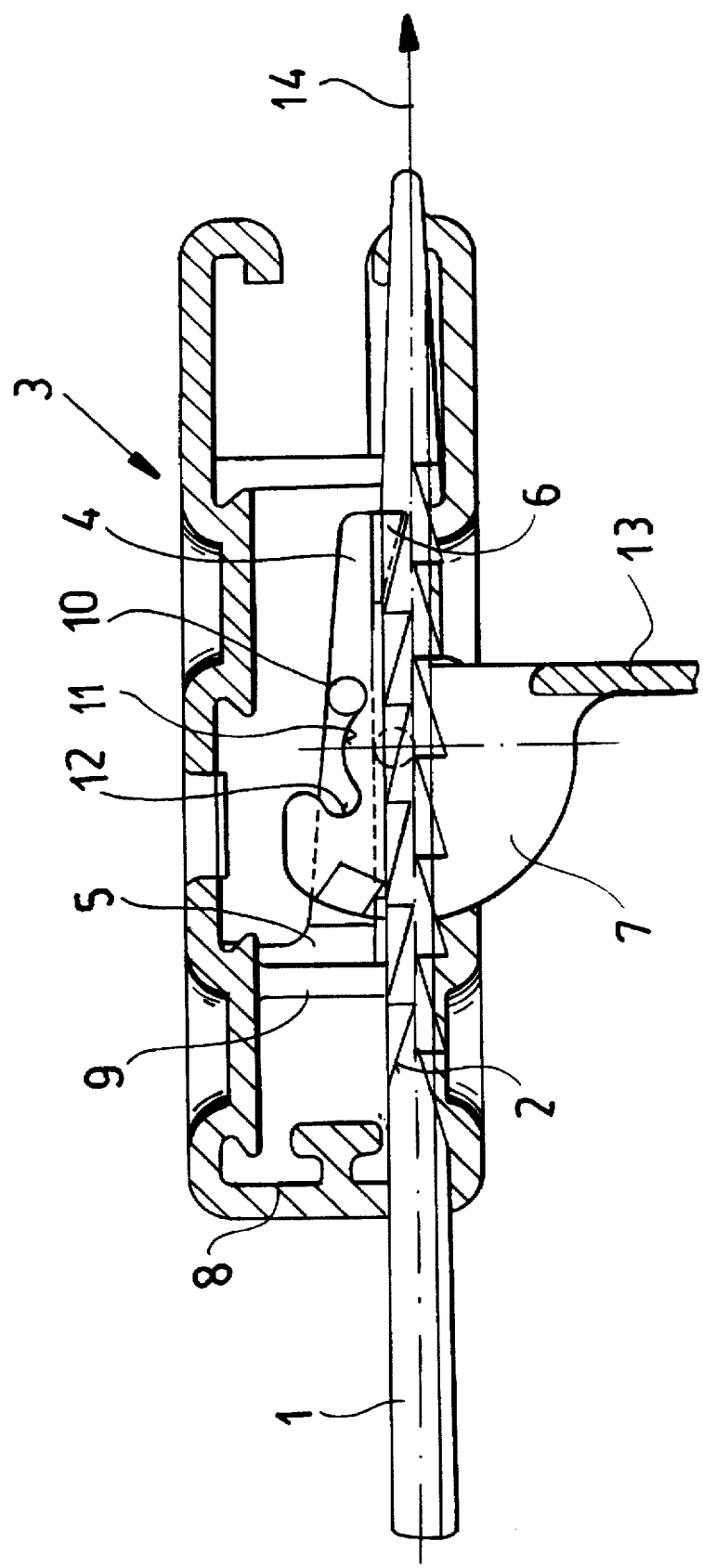
FIG. 2 is a side view of the device in the insertion position.

The handle 7 has also a formed-on actuation lever 13, which in the closed position according to FIG. 3 lies flush in a housing surface parallel to the insertion channel, in the insertion position project at a right angle from the housing as in FIG. 2, and in the out-of-engagement position according to FIG. 1 forms an obtuse angle with the position according to the closed position (FIG. 3).

In order to secure a wraparound packaging material, the element 1 is inserted according to the illustration in FIG. 1 into the insertion channel of the housing 8, whereby the locking device engages in the locking teeth 2. This way the element 1 can be pulled through the securing part in the direction of arrow 14. As soon as the target position is reached, the handle 7 is swung by manual action upon the actuation lever 13 from the position according to FIG. 2 into the position according to FIG. 3, so that the pin 10 of arm 4 is caught by the engagement cavity of handle 7 and blocked therewith. This way the element 1 is immovably held in the securing part. If the lock is to be opened, the handle is swung due to the actuation of the actuating lever 13 from the position according to FIG. 3 into the position according to FIG. 1, wherein the locking device 4 is forced into the out-of-engagement position due to the cooperation of the engagement cam 11 with the pin 10. The element 1 can then be pulled out of the securing part in the direction of arrow 15.

The wraparound packaging material can then be removed from the corresponding stack of goods and can be used again.

The invention is not limited to the embodiment example, but is rather multiply variable within the framework of the disclosure.

All novel individual or combined features disclosed in the specification and/or the drawing are considered essential to the invention.

I claim:

1. A device for securing a wraparound packaging material supplied along a path in a wrapping direction, said device comprising:

a longitudinal strap lying in a strap plane along said path and extending transversely to the wrapping direction of the material, said strap being formed with:

a first element provided with:

a housing formed with a pair of spaced apart lateral walls, means forming a longitudinal insertion channel traversing said housing, a longitudinal arm mounted on one of the lateral walls and extending substantially parallel to the strip plane and having a free end facing the other lateral wall, a pin mounted on said arm and spaced from said free end and extending along the wrapping direction, said arm being bendable about said pin between locking and open positions of the arm, a projection on the free end of the arm, and a handle mounted pivotally on the housing about a respective axis parallel to said pin of the arm and provided with cam means cooperating with the pin for translating movement to said arm upon displacing of the handle between respective positions corresponding to said open and locking positions of the arm; and a second element insertable into said insertion channel of the first element and extending in said strap plane toward said other lateral wall of the housing and provided with locking means for engageably receiving said projection of the first element upon bending said arm in said locking position by displacing said handle in the position corresponding to said locking position.

2. The device defined in claim 1 wherein said cam means is formed with an eccentric surface resting upon said pin in the open position of the arm and an arcuate surface adjacent the eccentric surface and formed with a recess receiving said pin in the locking position of the arm.

3. The device defined in claim 1 further comprising an actuating lever formed on the handle and lying in a respective plane parallel to said strap plane in said locking position of the arm and extending at an obtuse angle to said strap plane in the open position of the arm, said housing being formed with a bottom and said lever being flushed with said bottom in said locking position of the arm.

* * * * *